Oct. 7, 1930.  C. KREBS  1,777,497
REPRODUCING APPARATUS
Filed Sept. 14, 1929   2 Sheets-Sheet 1

Inventor:
Carlos Krebs,
by Roberts, Cushman & Woodbury,
Attys

Oct. 7, 1930.  C. KREBS  1,777,497
REPRODUCING APPARATUS
Filed Sept. 14, 1929   2 Sheets-Sheet 2

Inventor:
Carlos Krebs.
by Roberts, Cushman & Woodbury
Attys.

Patented Oct. 7, 1930

1,777,497

UNITED STATES PATENT OFFICE

CARLOS KREBS, OF BOSTON, MASSACHUSETTS

REPRODUCING APPARATUS

Application filed September 14, 1929. Serial No. 392,722.

This invention relates to an improvement in reproducing machines in which a tool, for example, a cutting torch, is controlled by the movement of a tracer or equivalent member over a pattern, such as a template.

The ultimate possibilities of machines of this type have not been realized because of the difficulties which have been encountered in attempting effectively to control a tool at some distance from the base, for example, the main carriage, of a machine. Attempts thus to extend the tool have unfavorably affected the accuracy of the machine, due to resulting increased intermittent and continued distortions of both the tool supporting means and the machine as a whole.

Attempts to increase the number of tools utilized in a machine of this type have likewise tended to reduce the accuracy of the machine because of the distortion of the tool supporting means by the increased weight of the tools.

As a result machines of this type have been unnecessarily limited in capacity both as regards size of work and number of simultaneously controlled tools. Accordingly, a primary object of my invention is to provide a reproducing mechanism in which the above described difficulties are obviated, and the more extensive exploitation of the latent possibilities of such machines with respect to capacity and accuracy is rendered possible. In a preferred construction of such a machine I employ a laterally extending portion of the machine for the purpose of restraining the tool to its desired path. I have found that the accuracy of the machine depends very materially upon the rigidity and manner of connection of this laterally extending portion of the machine to the main body of the machine. On the other hand, facility of maneuvering the machine with respect to the work and to other machines in a shop, often renders it desirable to move the tool past, but not over, the work, and further to reduce or eliminate the overhang from the main or base carriage of the laterally extending portion of the machine. Accordingly, further objects of my invention are to provide a machine in which these desirable features of ease of maneuvering are incorporated, and in which the tool restraining means is adapted to be retained with increased rigidity by the main portion of the machine.

A further object is to prevent binding of the movable parts of the machine when the apparatus is subject to the stresses incident to use. Other objects of this invention reside in the details of construction hereinafter set forth, as will be apparent to one skilled in the art from a consideration of the following specification taken in connection with the drawings which form a part thereof, and in which.

Figure 1:
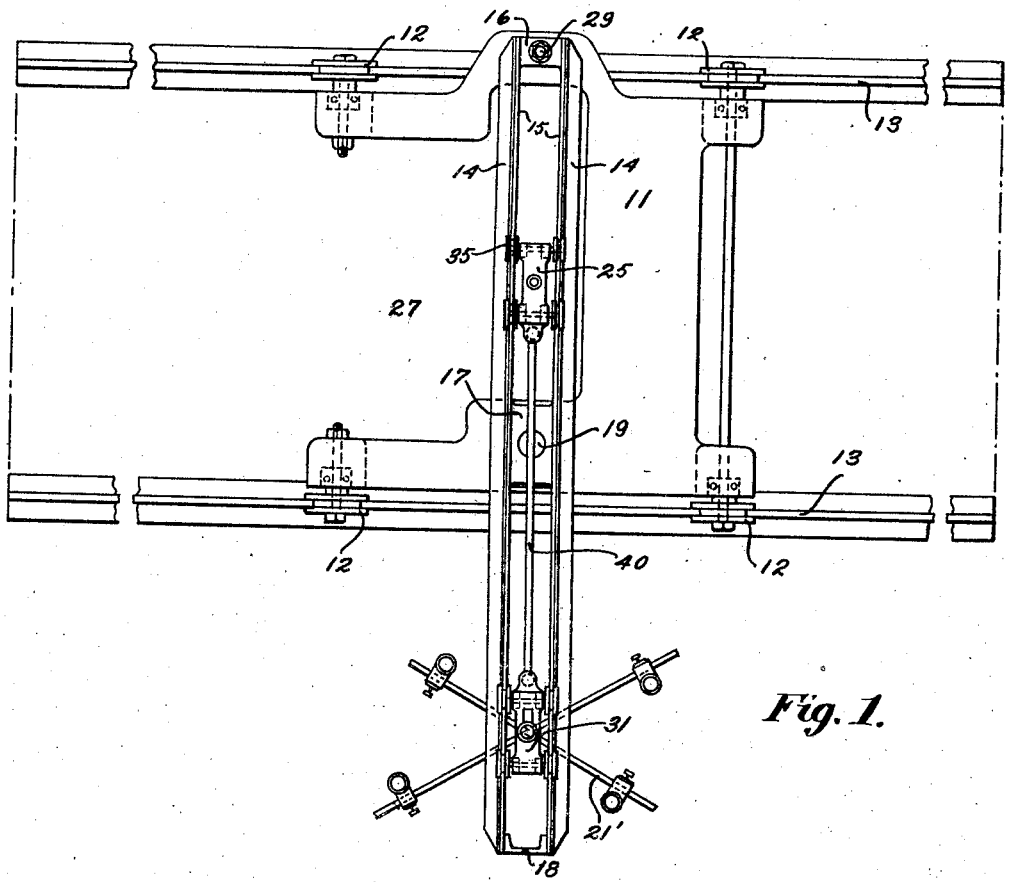
Fig. 1 is a plan view of one embodiment of my invention.
Figure 2:
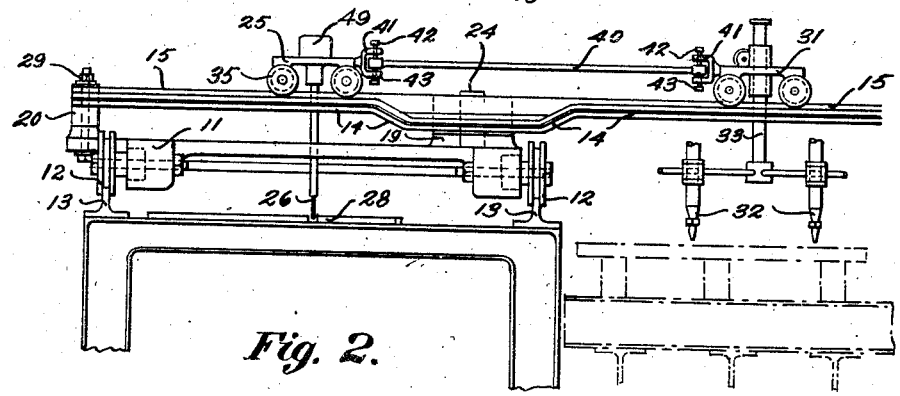
Fig. 2 is an end elevation of the apparatus of Fig. 1.

In the embodiment of the invention disclosed in Figs. 1 and 2, a rigid unitary main carriage 11 is constrained by its grooved wheels 12 to movement along the rails 13 of a longitudinal base guide. A structure in the form of a laterally extending track comprising angle irons 14, rails 15, and connecting webs 16, 17 and 18 rests upon slightly elevated portions 19 and 20 of the carriage which extend directly upwardly from adjacent the spaced rails 13 which comprise the longitudinal base guides for the carriage. The transverse guide structure is connected to these portions 19 and 20 of the carriage by a vertical pivot 24 extending from portion 19 and a removable bolt 29 extending from portion 20. By thus supporting the transverse guide at two points approximately in the vertical planes of the longitudinal base guides, I render it possible for a long transverse guide to be utilized without a tendency for its support to flex and cause vibration or deviation of the tool from its path.

The connection of the transverse guide to the carriage at two widely separated points increases the rigidity of the transverse guide as a whole and also the rigidity of its connection with the main carriage, preventing undesired angular vibration or rotation of the transverse guide with respect to the main carriage. While in the accompanying drawings, the angle between the transverse guide and the line of motion of the main carriage is ninety degrees, it will be apparent that this angular relation may be altered by a change in location of the removable bolt 29, and that my invention is not limited to the particular angular relation between the transverse guide and the carriage or its line of motion.

Upon the portion of the transverse guide that lies over the main carriage I support a movable tracer controlled element, and upon the portion of the transverse guide that extends outwardly to one side of the main carriage, I support a movable tool guiding element.

The tracer controlled element, exemplified by the four-wheeled template carriage 25, movable along this transverse guide across the space between the longitudinal guides is controlled by, and preferably is adapted to support, a tracer 26 which extends directly down from the center of support of this element through a cut away portion 27 of the main carriage to engage a template 28 below the main carriage. The tracer 26 is preferably caused automatically to move along the outline of the template by a suitable tracer actuating mechanism indicated generally at 49 and which may be of the type disclosed in my copending application, Serial No. 288,023, filed June 25, 1928.

The tracer actuated mechanism and its associated tracer are of considerable weight and I prefer to concentrate their weight upon the portion of the transverse guide above the main carriage. Thus this weight does not tend to flex downwardly the portion of the transverse guide that carries the tool guiding element, as in constructions wherein a portion of the weight of a tracer controlled carriage is borne by a cantilever track. Consequently, the outwardly extending portion of the transverse guide constitutes a much more rigid support for the tool guiding element. I deem this feature of value since this increased rigidity enables me to extend the transverse guide farther to the side than in previous devices and to support a greater number of tools thereon, and hence obtain a considerable increase in capacity both with respect to size of work and number of simultaneous cuts of the tools. In order thus to concentrate the weight of the tracer controlled element above the main carriage, I prefer to form the tracer controlled carriage 25 with a short wheel base. In this manner the wheels of this carriage do not bear upon the outwardly extending portion of the transverse guide.

Tool directing means, exemplified by a short four-wheeled carriage 31, movable along the transverse guide, and supported thereby at points normally removed from the main carriage 11, is adapted to direct, and preferably to support, any suitable number of tools such as the cutting torches 32. The transverse guide thus provides a rigid lateral support for the tool directing carriage. In order fully to utilize this rigidity and to minimize vibration, I prefer to mount the tool or tools as nearly as possible under the center of support of this tool directing carriage, in the present embodiment directly beneath the center of the carriage. In the illustration I have utilized as a tool support a vertical spindle 33, mounted centrally of the carriage 31. When a plurality of tools are employed, they are preferably disposed about the spindle 33 in a balanced group, as shown in Fig. 1, so that the center of gravity of the entire group is approximately centrally located with respect to the track supported tool directing means.

In order to cause the tracer controlled carriage to impart motion to the tool directing carriage, I have provided means for connecting these two carriages, and in the embodiment of the invention shown in Figs. 1 and 2 this comprises the laterally extending connecting rod 40 which is independent of the transverse guide and main carriage 11 and not required to carry the weight of either of the carriages or the working tools.

Referring to Fig. 2, it will be seen that the transverse guide over which the tracer controlled and tool directing carriages are adapted to move comprises essentially a beam fixed at two points, namely at the pivot 24 and at the bolt 29. In moving tracer 26 along the outline of the template 28 either manually or by an automatic tracer driving mechanism, a certain amount of thrust is imparted to the transverse guide by the tracer controlled carriage 25, and the tendency of this thrust is to cause a flexure of the transverse guide in a horizontal plane between the pivot 19 and the bolt 29, and a corresponding flexure of the portion of the transverse guide adjacent the tool directing carriage 31. When the transverse guide is thus flexed the two carriages 25 and 31 will occupy portions of the guide that have been rendered non-parallel by this flexure. Each of the carriages 25 and 31 is provided with grooved wheels 35 which closely engage the rails 15 of the transverse guide in order that the carriages may be accurately restrained in their movement. Accordingly, I prefer to construct the connecting means for the two carriages in such a manner as to permit both angular and lateral displacement of the two carriages as they move along the flexed transverse guide whereby these carriages are free from any tendency to bind. In the embodiment of the invention shown in Figs. 1 and 2, I enable the connecting rod 40 to function in this manner by pivoting it to each of the carriages 25 and 31. Referring to Fig. 2, it will be seen that the connecting rod 40 enters a yoke 41 on each of these carriages, and that vertically disposed pins 42 and 43 positively and pivotally engage each of its ends.

By virtue of the construction described above, the working tools and the tracer are freely movable without any tendency toward binding with the transverse guide, and the working tools are directed by means carried by a vertically rigid guide which minimizes deflection and vibration of the tools.

Figure 3:
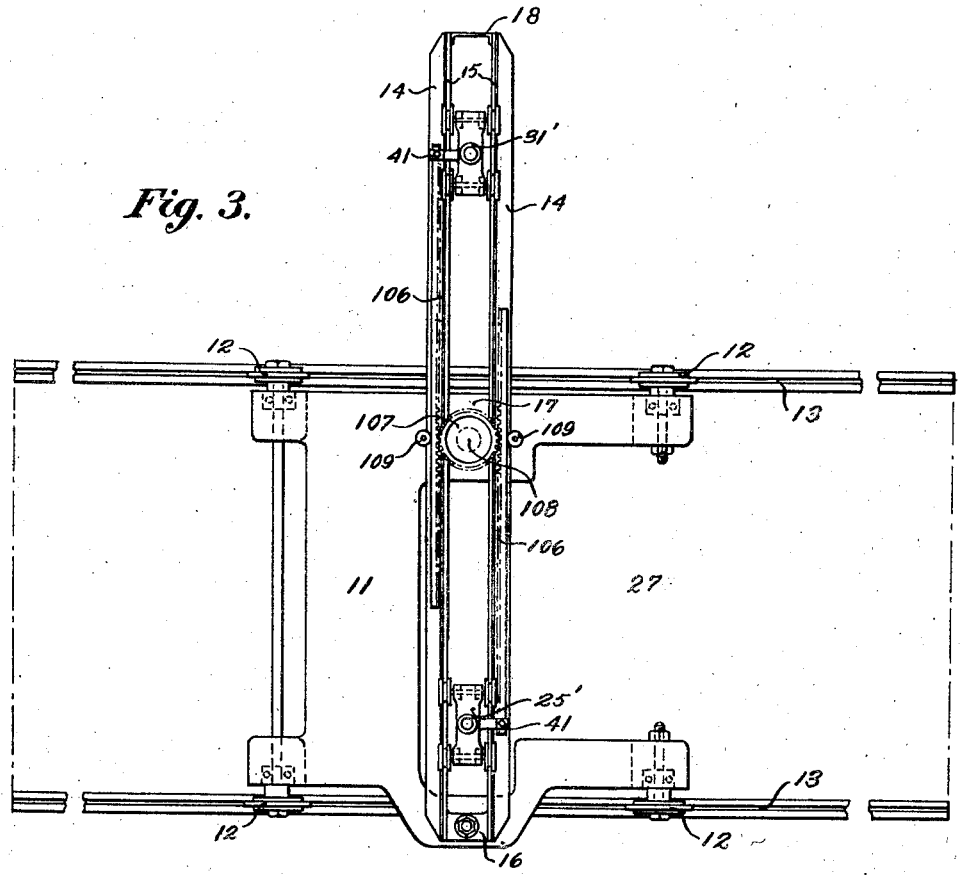
Fig. 3 is a plan view of another embodiment of my invention.
Figure 4:
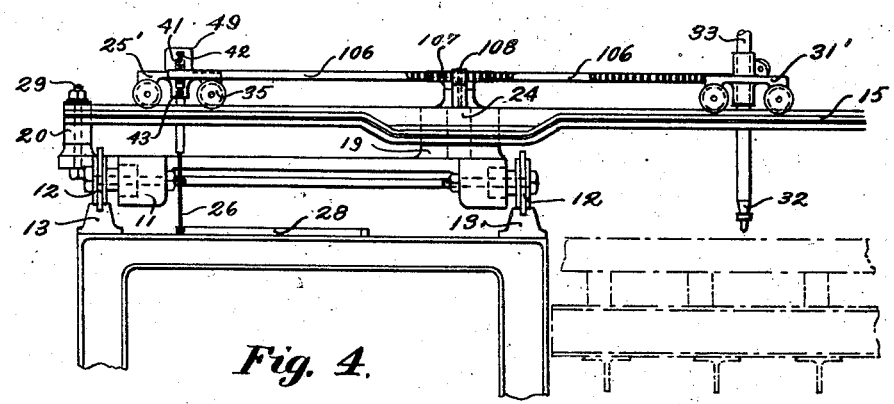
Fig. 4 is an end elevation of the apparatus of Fig. 3.

The embodiment shown in Figs. 3 and 4 is similar in many respects to that shown in Figs. 1 and 2. Accordingly the same reference numerals have been applied wherever possible and no description is believed to be necessary regarding the common features. The tracer controlled carriage 25' and the tool directing carriage 31' function in the same manner in this embodiment as in the previously described embodiment, but the motion of the tracer controller carriage is transmitted to the tool directing carriage by means of a gear and rack bar construction of the type described in my copending applications, Serial No. 288,023 filed June 25, 1928, and Serial No. 347,065 filed March 14, 1929.

This gear and rack bar construction as applied to the present embodiment comprises a pair of rack bars 106 and a gear 107 with which the teeth on the bars mesh. The gear 107 is mounted upon a stub shaft 108 carried by the main carriage 11, and preferably coaxial with the pivot 24. Suitably mounted idler rollers 109 hold the teeth of the bars 106 in mesh with the gear 107. The outer ends of the bars 106 are attached to the carriages 25' and 31' by suitable flexible connections such, for example, as those described in the embodiment of Figs. 1 and 2. In this construction, the two carriages 25' and 31' move simultaneously and produce a reversal of pattern.

In the operation of each of the two embodiments of the invention, the movement of the tracer is communicated to the tool or tools by the mechanism described above. The rigid connection of the transverse guide at spaced points to the main carriage, the positioning of the guide-supported tool-directing means adjacent and above the tool, and the accuracy of engagement of the wheels with the rails of the transverse guide serve to minimize vibration and deviation of the tool from its theoretical path. At the same time, the flexible connection between the tracer controlled element and the tool directing means permits free movement along the transverse guide without any tendency to binding, even when the transverse guide is somewhat flexed in a horizontal plane.

According to my invention, it is possible to perform operations accurately on quite large work since the defects in accuracy which usually accompany the use of a tool at a point distant from the main or base carriage do not appear in my improved machines. For the same reason, a considerable number of tools may be carried simultaneously by the tool controlling means, and the capacity of the machine thus increased.

After the work has been finished and it is desired to move the main carriage to its original or a new working position, the bolt 29 may be removed and the transverse guide then swung in over the main carriage. In this position, the tools are out of the way of the finished work.

I claim:

1. A reproducing machine comprising spaced longitudinal guides, a main carriage movably mounted on said guides, a transverse guide on said carriage, a template carriage mounted on said transverse guide to move across the space between the longitudinal guides, an extension from said main carriage beyond said space, a tool directing carriage on said extension, and means interconnecting the template carriage and the tool directing carriage for conjoint movement relative to the main carriage.

2. A reproducing machine comprising spaced longitudinal guides, a main carriage movably mounted on said guides, a transverse guide on said carriage, a template carriage mounted on said transverse guide to move across the space between the longitudinal guides, an extension from said main carriage beyond said space, a tool directing carriage on said extension, and means interconnecting the template carriage and the tool directing carriage for conjoint movement relative to the main carriage, the main carriage having portions extending directly from the longitudinal guides to said transverse guide for directly supporting the transverse guide at points approximately in the vertical planes of the longitudinal guides.

3. A reproducing machine comprising spaced longitudinal guides, a main carriage movably mounted on said guides, a transverse guide on said carriage, a template carriage mounted on said transverse guide to move across the space between the longitudinal guides, an extension from said main carriage beyond said space, a tool directing carriage on said extension, and means interconnecting the template carriage and the tool directing carriage for conjoint movement relative to the main carriage, said means permitting angular movement of said two carriages relatively to each other.

4. A reproducing machine comprising spaced longitudinal guides, a main carriage movably mounted on said guides, a transverse guide on said carriage, a template carriage mounted on said transverse guide to move across the space between the longitudinal guides, an extension from said main carriage beyond said space, a tool directing carriage on said extension, and means interconnecting the template carriage and the tool directing carriage for conjoint movement relative to the main carriage, said means permitting said carriages to move simultaneously on respective portions of the transverse guide which have been rendered non-parallel by distortion.

5. A reproducing machine wherein the movement of the reproducing means is controlled by that of a tracer relative to a template, comprising longitudinal base guides, a main carriage movable thereon, a transverse guide carried by said main carriage and adapted to extend laterally beyond said main carriage, a tracer adapted to engage a template lying between said base guides, a tracer controlled member movable along said transverse guide by the action of said tracer, tool directing means on said second track, the weight of said tool directing means being carried by said second track independently of that of the tracer controlled member.

6. A reproducing machine wherein the movement of the reproducing means is controlled by that of a tracer relative to a template, comprising a movable main carriage, a transverse guide carried by said main carriage and adapted to extend laterally from said main carriage, a tracer controlled member movable on said transverse guide over the main carriage, a tracer movable with said tracer controlled member and adapted to engage a template beneath said main carriage, a reproducing tool, tool directing means movably supported on the portion of said transverse guide which extends laterally from the main carriage, a tool adjacent said tool directing means, and means for connecting said tracer controlled member and the tool directing means.

7. A reproducing machine wherein the movement of the reproducing means is controlled by that of a tracer relative to a template, comprising a movable main carriage, a transverse guide carried by said main carriage and adapted to extend laterally from said main carriage, a tracer controlled member movable on said transverse guide over the main carriage, a tracer movable with said tracer controlled member and adapted to engage a template beneath said main carriage, a reproducing tool, tool directing means associated with said tool and movable on the portion of said transverse guide which extends laterally from the main carriage, and means for connecting said tracer controlled member and the tool directing means, the weight of the tracer controlled member and the weight of the tool directing means being substantially independently borne by the transverse guide.

8. A reproducing machine wherein the movement of the reproducing means is controlled by that of a tracer relative to a template, comprising a movable carriage, a transverse guide carried by said carriage and adapted to extend laterally thereof, means for securing said guide to said main carriage to prevent rotation of said guide about said main carriage, a tracer movable along said guide, tool directing means movable along said guide and normally supported by said guide in positions laterally removed from said carriage, a reproducing tool adapted to be directed by said tool directing means, and means connecting said tracer to said tool directing means whereby the movement of the tracer relative to a template is transmitted to the tool.

9. A reproducing machine wherein the movement of the reproducing means is controlled by that of a tracer relative to a template comprising a movable carriage, a transverse guide carried by said carriage and adapted to extend laterally therefrom, said guide being pivotally connected to said carriage adjacent one side of the carriage, means including a removable securing member for securing said guide to said carriage at the side opposite to said pivotal connection, a tracer movable along said guide, movable tool directing means on said guide normally supported by said guide in positions laterally removed from said carriage, a reproducing tool adapted to be directed by said tool directing means, and means connecting said tracer to said tool directing means whereby the movement of the tracer relative to the template is transmitted to the tool.

10. A reproducing machine wherein the movement of the reproducing means is controlled by that of a tracer relative to a template, comprising a movable main carriage, a transverse guide carried by said main carriage and adapted to extend laterally therefrom, means for securing said guide to said main carriage to prevent rotation of said guide with respect to said main carriage, a template carriage on said guide, a tracer movable with said template carriage, a tool directing carriage on said guide normally laterally removed from said main carriage, a reproducing tool adapted to be directed by said tool directing carriage, and means connecting the template carriage and the tool directing carriage whereby the movement of the tracer relative to the template is transmitted to the tool.

11. A reproducing machine wherein the movement of the reproducing means is controlled by that of a tracer relative to a template, comprising a movable main carriage, a transverse guide carried by said main carriage and adapted to extend laterally therefrom, means for securing said guide to said main carriage to prevent rotation of said guide with respect to said main carriage, a template carriage on said guide, a tracer movable with said template carriage, a tool directing carriage on said guide normally laterally removed from said main carriage, a reproducing tool adapted to be directed by said tool directing carriage, and connecting means connecting the template carriage and tool directing carriage whereby the movement of the tracer relative to the template is transmitted to the tool, said connecting means permitting angular movement of said connected carriages relatively to each other.

12. A reproducing machine wherein the movement of the reproducing means is controlled by that of a tracer relative to a template, comprising a movable main carriage, a transverse guide carried by said main carriage and adapted to extend laterally therefrom, means for securing said guide to said main carriage to prevent rotation of said guide with respect to said main carriage, a template carriage on said guide, a tracer movable with said template carriage, a tool directing carriage on said guide normally laterally removed from said main carriage, a reproducing tool adapted to be directed by said tool directing carriage, and connecting means connecting the template carriage and tool directing carriage whereby the movement of the tracer relative to the template is transmitted to the tool, said means permitting said carriages to move simultaneously on respective portions of the transverse guide which have been rendered non-parallel by distortion.

Signed by me at Boston, Massachusetts, this eleventh day of September, 1929.

CARLOS KREBS.